(12) United States Patent
Lo

(10) Patent No.: US 7,032,464 B2
(45) Date of Patent: Apr. 25, 2006

(54) CLOSED-LOOP WATERBRAKE DYNAMOMETER FLUID VOLUMETRIC CONTROL SYSTEM AND METHOD

(75) Inventor: Charles S. Lo, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 381 days.

(21) Appl. No.: 10/160,559

(22) Filed: May 31, 2002

(65) Prior Publication Data

US 2003/0223890 A1 Dec. 4, 2003

(51) Int. Cl.
*G01L 3/20* (2006.01)
(52) U.S. Cl. .................................................. 73/862.14
(58) Field of Classification Search ............. 73/862.14, 73/862.01, 862.08, 862.16, 862, 862.09, 73/862.11, 862.12
See application file for complete search history.

(56) References Cited

U.S. PATENT DOCUMENTS

| | | | |
|---|---|---|---|
| 3,050,993 A | | 8/1962 | Draughon et al. |
| 3,115,034 A | * | 12/1963 | De Hart .................. 73/862.14 |
| 3,298,224 A | | 1/1967 | Birchall et al. |
| 3,807,912 A | | 4/1974 | Keller |
| 3,851,524 A | * | 12/1974 | Liu ......................... 73/862.11 |
| 3,940,978 A | * | 3/1976 | Akkerman et al. ........... 73/117 |
| 3,943,713 A | | 3/1976 | Walton |
| 4,020,684 A | * | 5/1977 | Dodt ....................... 73/862.14 |
| 4,144,421 A | * | 3/1979 | Sakai ......................... 200/61.4 |
| 4,215,569 A | * | 8/1980 | Bonomo et al. ......... 73/862.14 |
| 5,127,805 A | | 7/1992 | Fallis et al. |
| 5,571,975 A | | 11/1996 | Smith, Jr. et al. |
| 5,834,654 A | * | 11/1998 | McFarland ............... 73/862.14 |
| 6,250,887 B1 | | 6/2001 | Kuwabara et al. |
| 6,256,987 B1 | | 7/2001 | Stolle |
| 6,324,367 B1 | | 11/2001 | Ateya et al. |
| 6,708,557 B1 | * | 3/2004 | Moskwa et al. .............. 73/116 |

FOREIGN PATENT DOCUMENTS

JP 57 059130 A 9/1982

OTHER PUBLICATIONS

PCT International Search Report PCT/US03/17041, May 30, 2003.

* cited by examiner

*Primary Examiner*—Max Noori
(74) *Attorney, Agent, or Firm*—Ingrassia Fisher & Lorenz

(57) ABSTRACT

A waterbrake dynamometer fluid volumetric control system and method includes a closed-loop recirculation passage to maintain a substantially constant fluid volume within the waterbrake. Fluid volume within the waterbrake is controlled by selectively supplying fluid to, and removing fluid from, the waterbrake.

15 Claims, 6 Drawing Sheets

CLOSED-LOOP WATERBRAKE DYNAMOMETER FLUID VOLUMETRIC CONTROL SYSTEM AND METHOD

FIELD OF THE INVENTION

The present invention relates to waterbrake dynamometer systems and, more particularly, to a system and method for controlling the fluid volume within a waterbrake.

BACKGROUND OF THE INVENTION

Dynamometers are devices that are used to measure power, force, or energy. One particular type of dynamometer is known as a waterbrake dynamometer. A waterbrake dynamometer may be used to test various rotating machines such as engines and motors. In particular, a waterbrake dynamometer may be used to measure, for example, the horsepower generated by a rotating machine, such as an engine or motor.

A waterbrake dynamometer typically includes a waterbrake that may be coupled to a fluid system. The waterbrake generally includes a rotor that is rotationally mounted within a housing. The housing includes fluid inlet and outlet ports coupled to the fluid system, which allows fluid, such as water, to flow into and out of the waterbrake housing. During use, the output shaft of the rotating machine under test may drive the waterbrake rotor. Fluid within the waterbrake applies a load to the waterbrake rotor, and thus to the rotating machine output shaft. The torque generated by the output shaft may be measured and used to determine the output power of the rotating machine.

It is generally known that the magnitude of the load applied to the machine output shaft is proportional to the fluid volume within the waterbrake, at a given fluid temperature. Thus, to apply a predetermined load magnitude to the machine 120, and maintain the predetermined load magnitude substantially constant, a substantially constant volume of water, at a substantially constant temperature (or temperature range), should be maintained within the waterbrake. As the waterbrake rotor rotates, it transfers energy to the fluid within the waterbrake housing, which may cause the temperature of the fluid to increase. Therefore, to control the load applied to the machine under test, the fluid volume and fluid temperature within the waterbrake should be controlled.

In the past, fluid volume and temperature within the waterbrake has been controlled using an open-loop fluid system. In such systems, fluid may be supplied to the waterbrake from a fluid source, such as a cooling tower reservoir. The volume of fluid supplied to the waterbrake may be controlled using one or more control valves mounted in the supply line between the waterbrake and the fluid source. Hot fluid may then be discharged from the waterbrake to a hot well, either directly or via one or more flow or back-pressure control valves. The fluid in the hot well may then be pumped back to the cooling tower, where it is cooled and returned to the cooling tower reservoir for recirculation through the waterbrake.

Although the above-described systems work well, each suffers certain drawbacks. For example, the fluid volume and temperature within the waterbrake, and thus the load applied to the machine under test, is controlled by the fluid flow rate through the waterbrake, which can be difficult to regulate. In addition, because the fluid system is open, there is an increased likelihood that the system may become contaminated. This increased likelihood of contamination may in turn lead to the use of additional components, such as filters and pumps to draw fluid through the filters, which may increase system complexity and cost.

Hence, there is a need for a waterbrake dynamometer fluid volumetric control system and method that does not use fluid flow rate control to control fluid volume and temperature in the waterbrake, and/or is relatively easy to regulate fluid volume and temperature, and/or reduces the likelihood of fluid system contamination, and/or is less complex and less costly. The present invention addresses one or more of these needs.

SUMMARY OF THE INVENTION

The present invention provides a waterbrake dynamometer with a fluid volumetric control system and method that uses a closed-loop recirculation passage to maintain a substantially constant fluid volume within the waterbrake, and controls waterbrake fluid volume by selectively supplying fluid to, and removing fluid from, the waterbrake.

In one embodiment of the present invention, and by way of example only, a waterbrake dynamometer fluid volumetric control system includes a waterbrake, a fluid recirculation passage, and a reversible pump assembly. The waterbrake has a fluid inlet port and a fluid outlet port. The fluid recirculation passage directly couples the waterbrake fluid outlet port in closed-loop, series-fluid communication with the waterbrake fluid inlet port. The reversible pump assembly has at least a first port coupled in series-fluid communication with the waterbrake fluid inlet and a second port adapted for coupling to a fluid supply.

In another exemplary embodiment, a waterbrake dynamometer fluid volumetric control system includes a waterbrake, a fluid recirculation passage, first and second fluid passages, and first and second valves. The waterbrake has a fluid inlet port and a fluid outlet port. The fluid recirculation passage directly couples the waterbrake fluid outlet port in closed-loop, series-fluid communication with the waterbrake fluid inlet port. The first fluid passage has an inlet and an outlet, the first fluid passage inlet adapted for coupling to a fluid supply and the first fluid passage outlet coupled in series-fluid communication with the fluid recirculation passage. The first valve is mounted on the first fluid passage and is moveable to selectively supply fluid from the fluid supply to the waterbrake. The second fluid passage has an inlet and an outlet, the second fluid passage inlet is coupled in series-fluid communication with the fluid recirculation passage. The second valve is mounted on the second fluid passage and is moveable to selectively discharge fluid from the waterbrake via the second fluid passage outlet.

In still a further exemplary embodiment, a waterbrake dynamometer fluid volumetric control system includes a waterbrake, fluid recirculation means, and fluid volumetric control means. The waterbrake has a fluid inlet port and a fluid outlet port. The fluid recirculation means is for recirculating fluid from the waterbrake fluid outlet port directly to the waterbrake fluid inlet port. The fluid volume control means is for selectively supplying fluid volume to, and removing fluid volume from, the waterbrake.

In yet another exemplary embodiment, in a waterbrake dynamometer system having a waterbrake including a fluid inlet port, a fluid outlet port, and a rotationally mounted rotor, a method of controlling fluid volume in the waterbrake includes directly coupling the waterbrake fluid inlet and the waterbrake fluid outlet in closed-loop, series-fluid communication with one another, whereby the waterbrake rotor pumps fluid from the waterbrake fluid outlet port to the waterbrake fluid inlet port, and selectively supplying fluid volume to, and removing fluid volume from, the waterbrake.

In yet still a further exemplary embodiment, a method of testing a machine having at least one rotating output shaft includes supplying a waterbrake having a rotationally mounted input shaft, a fluid inlet, and fluid outlet. The waterbrake fluid inlet port and the waterbrake fluid outlet port are directly coupled in closed-loop, series-fluid communication with one another. The machine output shaft is coupled to the waterbrake input shaft. The machine is run to rotate its output shaft, and fluid is selectively supplied to, and removed fluid from, the waterbrake to control fluid volume within the waterbrake, whereby a predetermined torque is maintained on the machine output shaft.

Other independent features and advantages of the preferred waterbrake dynamometer volumetric control system will become apparent from the following detailed description, taken in conjunction with the accompanying drawings which illustrate, by way of example, the principles of the invention.

DETAILED DESCRIPTION OF A PREFERRED EMBODIMENT

Figure 1:
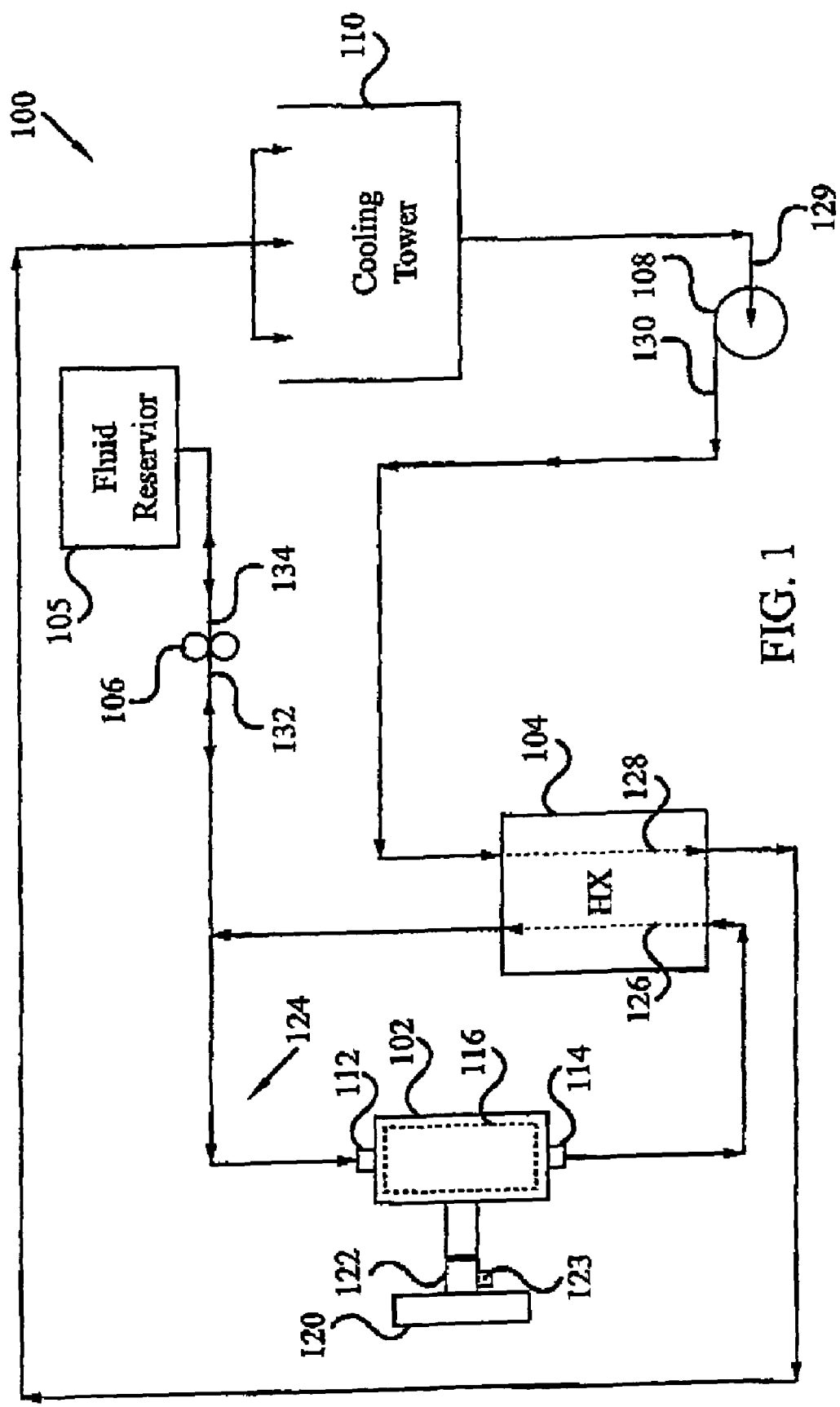
FIG. 1 is a piping schematic diagram of a waterbrake dynamometer system according to a preferred embodiment of the present invention.

A piping schematic of a particular preferred embodiment of a waterbrake dynamometer fluid volumetric control system 100 is shown in FIG. 1. In the depicted embodiment, the system 100 includes a waterbrake 102, a heat exchanger 104, a waterbrake fluid reservoir 105, a reversible pump assembly 106, a cooling pump 108, and a cooling tower 110. The waterbrake 102 includes at least one fluid inlet port 112 to receive a fluid such as, for example, water, into the waterbrake 102, and at least one fluid outlet port 114 to discharge fluid from the waterbrake 102. A rotor 116 is rotationally mounted within the waterbrake 102 and includes a shaft 118. As will be described in more detail below, when the waterbrake 102 is being used to test a rotating machine 120 such as, for example, a motor or engine, an output shaft 122 of the rotating machine 120 is coupled to the waterbrake rotor shaft 118. A torque sensor 123 may be coupled to either the machine output shaft 122 or the waterbrake input shaft 118 to measure the torque applied to the machine 120.

The waterbrake fluid outlet port 114 is directly coupled in closed-loop, fluid-series communication with the fluid inlet port 112, via a fluid recirculation passage 124. As is generally known, when the rotor 116 is being rotated, not only does the waterbrake 102 apply a load to the machine 120 under test, but it also acts as a pump. Thus, the waterbrake 102 discharges the fluid within the waterbrake 102 out the fluid outlet port 114. The discharged fluid is then returned back to the fluid inlet port 112, via the fluid recirculation passage 124.

As the machine 120 under test rotates the rotor 116, energy is imparted to the volume of fluid that is within, and circulating through, the waterbrake 102, causing the fluid temperature to increase. If heat is not removed from the fluid, it could potentially flash to its gaseous state. In addition, because fluid properties, such as density and viscosity, vary with temperature, fluid temperature variations can affect the load being applied by the waterbrake 102 to the machine 120. Thus, the heat exchanger 104 is installed in the system 100 to remove heat from the fluid recirculating through the waterbrake 102 to maintain a substantially constant ΔT (differential temperature) across the waterbrake 102. The heat exchanger 104 includes has at least two fluid flow paths running through it, a first flow path 126 and a second flow path 128. The first flow path 126 is coupled in series-fluid communication with the fluid recirculation passage 124. The second flow path 128 is coupled in series-fluid communication with a cooling fluid system. In the depicted embodiment, this cooling fluid system includes the cooling tower 110 and the cooling pump 108. With this configuration, fluid discharged from the waterbrake fluid outlet port 114 enters the fluid recirculation passage 124 and flows through the heat exchanger 104. As this recirculating fluid passes through the heat exchanger 104, it is cooled by the fluid flowing in the second flow path 128. The recirculating fluid then flows back into the waterbrake fluid inlet port 112. It should be appreciated that the heat exchanger 104 may be any one of numerous known heat exchanger designs known in the art such as, for example, a plate and frame heat exchanger, a cross-flow heat exchanger, or a tube-and-shell heat exchanger. It will additionally be appreciated that the working fluid in the waterbrake may be any one of numerous fluids known in the art including, but not limited to, water, anti-freeze, and oil.

The cooling pump 108 has an inlet 129 and an outlet 130, and is coupled in fluid communication between the cooling tower 110 and the heat exchanger second flow path 128. In particular, the cooling pump inlet 129 is in fluid communication with the cooling tower 110, and the cooling pump outlet 130 is in fluid communication with the heat exchanger second flow path 128. Hence, the cooling pump 108 takes a suction from the cooling tower 110 and supplies cooling fluid to the heat exchanger second flow path 128. After the cooling fluid is warmed by the fluid flowing through the recirculation passage 124, it flows back to the cooling tower 110, where heat is transferred from the warmed cooling fluid to the surrounding environment. It should be appreciated that the cooling tower 110 may be any one of numerous designs known in the art. It should additionally be appreciated that the present invention is not limited to use of a cooling tower to cool the warmed cooling fluid. Indeed, any one of numerous heat exchange or heat removal devices known in the art could be used instead of the cooling tower 110 to remove heat from the warmed cooling fluid.

The reversible pump assembly 106 is coupled in series-fluid communication between the fluid reservoir 105 and the waterbrake 102. The reversible pump assembly 106 is preferably one of numerous single pump designs known in the art that have reverse flow capabilities. Alternatively, the reversible pump assembly 106 may include two or more individual pumps that are each configured within the system 100 to pump fluid in opposite directions. In either case, the reversible pump assembly 106 may be used to supply fluid to, and remove fluid from, the waterbrake 102. To do so, the reversible pump assembly 106 includes at least a first inlet/outlet port 132 and a second inlet/outlet port 134. The first inlet/outlet port 132 is coupled in series-fluid communication with the waterbrake fluid inlet port 112, and the second inlet/outlet port 134 is coupled in fluid communication with the fluid reservoir 105. When fluid is being supplied to the waterbrake 102, the reversible pump assembly 106 draws fluid from the fluid reservoir 105 into the second inlet/outlet port 134 and discharges it out the first inlet/outlet port 132 into the waterbrake 102. Conversely, when fluid is being removed from the waterbrake 102, the reversible pump assembly draws fluid from the waterbrake 102 into the first inlet/outlet port 132 and discharges it out the second inlet/outlet port 134 into the fluid reservoir 105.

As was previously noted, a rotating machine 120 may be tested using the waterbrake dynamometer volumetric control system 100 by coupling the machine output shaft 122 to the waterbrake rotor shaft 118. As the machine 120 rotates the rotor 116, the waterbrake 102 not only applies a load to the machine, but it also acts as a pump. Thus, fluid within the waterbrake is discharged out the waterbrake fluid outlet 114, flows through the recirculation passage 124 and heat exchanger 104, and back into the waterbrake 102 via the waterbrake fluid inlet 112. As was also previously noted, the load applied to the machine 120 by the waterbrake 102 is proportional to the fluid volume within the waterbrake 102. Therefore, to apply a particular desired load magnitude to the machine 120, fluid is supplied to, or removed from, the waterbrake 102, via the reversible pump assembly 106, until the desired load magnitude is attained. Thereafter, because the fluid recirculation passage 124 directly couples the waterbrake fluid outlet port 114 in closed-loop, series-fluid communication with the waterbrake fluid inlet port 112, the fluid volume within the waterbrake 102, and thus the load on the machine 120, will remain substantially constant.

Figure 2:
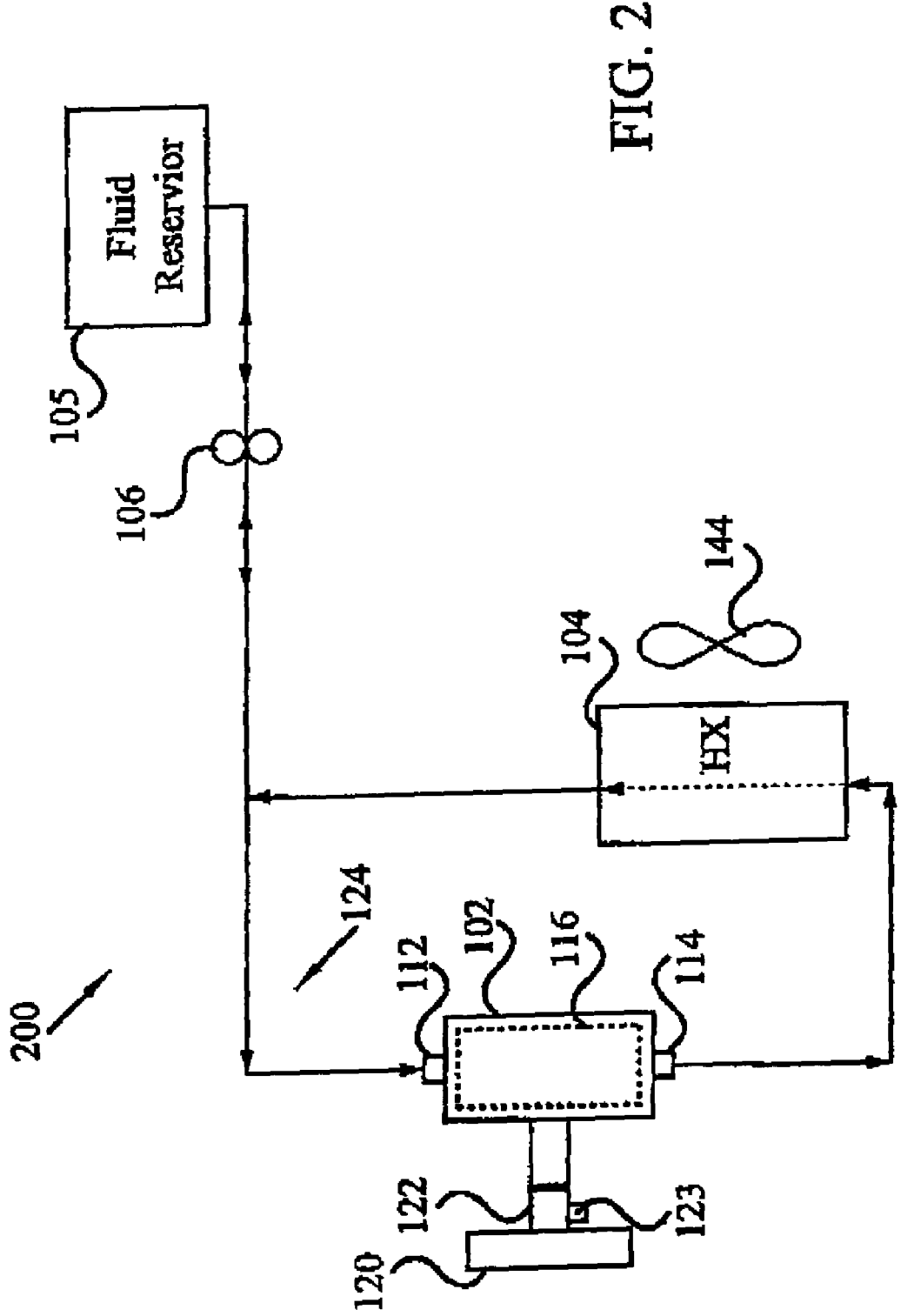
FIGS. 2–6 are piping schematic diagrams of a waterbrake dynamometer systems according to alternate embodiments of the present invention.

Turning now to FIG. 2, an alternative embodiment of a waterbrake dyanamometer volumetric fluid control system will be described. In this alternate system 200 a separate cooling system is not included. Instead, the heat exchanger transfers heat from the fluid recirculating through the waterbrake 102 to ambient air. The heat exchanger 104 may do so by radiation heat transfer, or a fan 144 may be used to force ambient air through the heat exchanger 104 to remove heat by convection.

Figure 3:
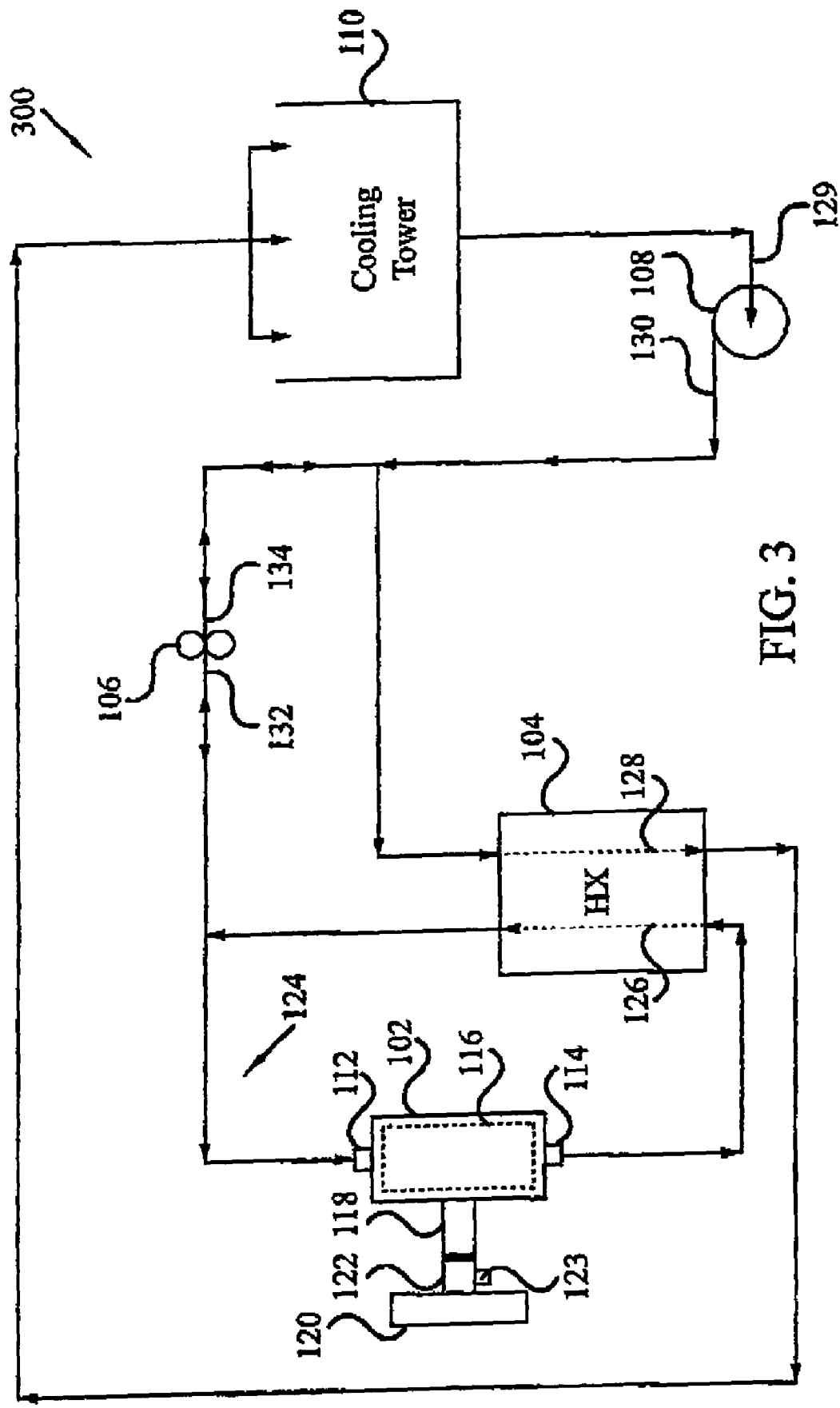

Another alternative embodiment of a waterbrake dyanamometer volumetric fluid control system is illustrated in FIG. 3. In this embodiment, the system 300 does not include a separate fluid reservoir 105. Rather, the reversible pump 106 is coupled in series-fluid communication between the cooling pump 108 and the waterbrake 102. In particular, the first inlet/outlet port 132 is coupled in series-fluid communication with the waterbrake fluid inlet port 112, and the second inlet/outlet port 134 is coupled in fluid communication with the cooling pump outlet 130. Hence, similar to the embodiment depicted in FIG. 1, when fluid is being supplied to the waterbrake 102, the reversible pump assembly 106 draws fluid from the fluid reservoir 105 into the second inlet/outlet port 134 and discharges it out the first inlet/outlet port 132 into the waterbrake 102, and when fluid is being removed from the waterbrake 102, the reversible pump assembly draws fluid into the first inlet/outlet port 132 and discharges it out the second inlet/outlet port 134.

Figure 4:
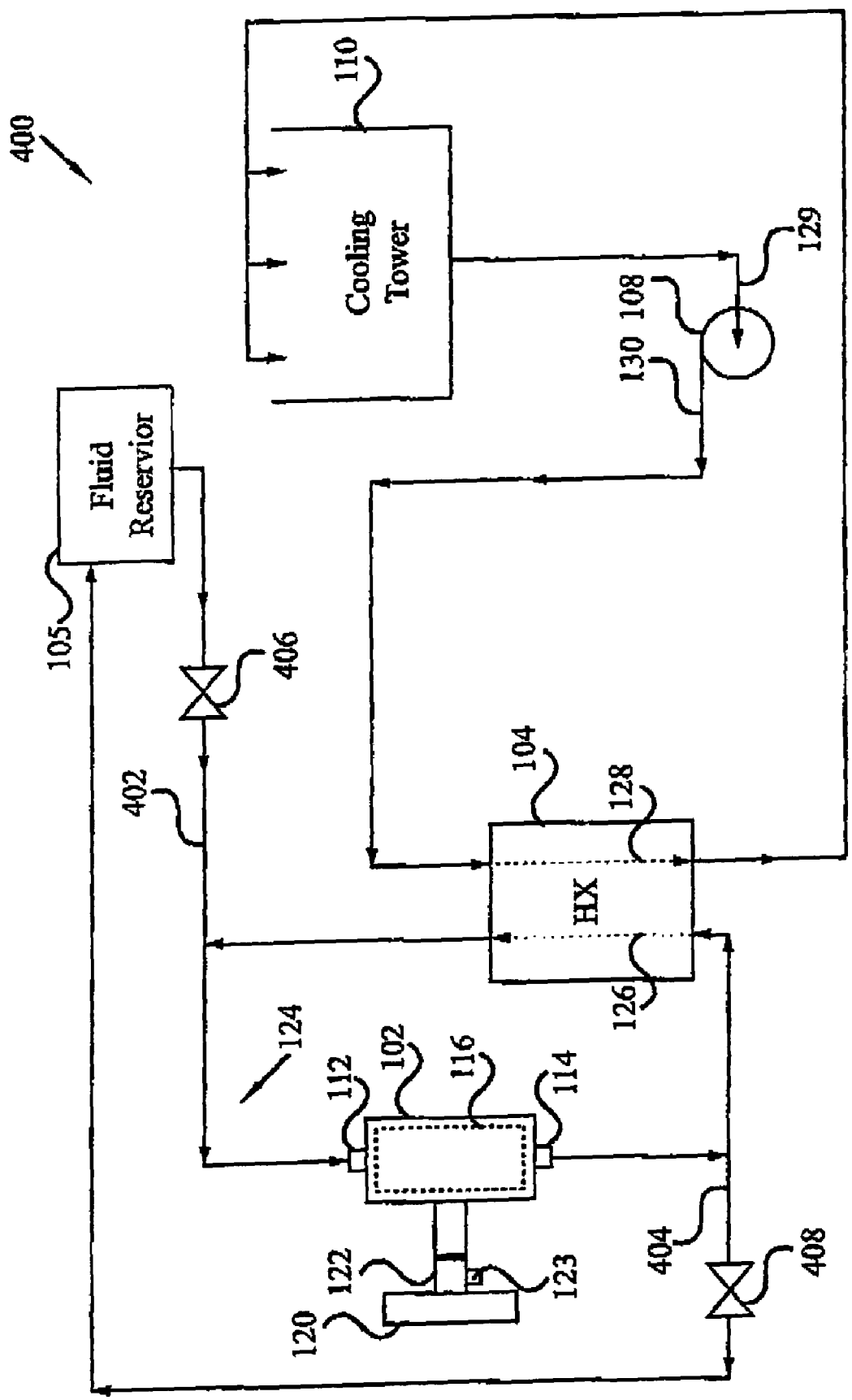
Figure 5:
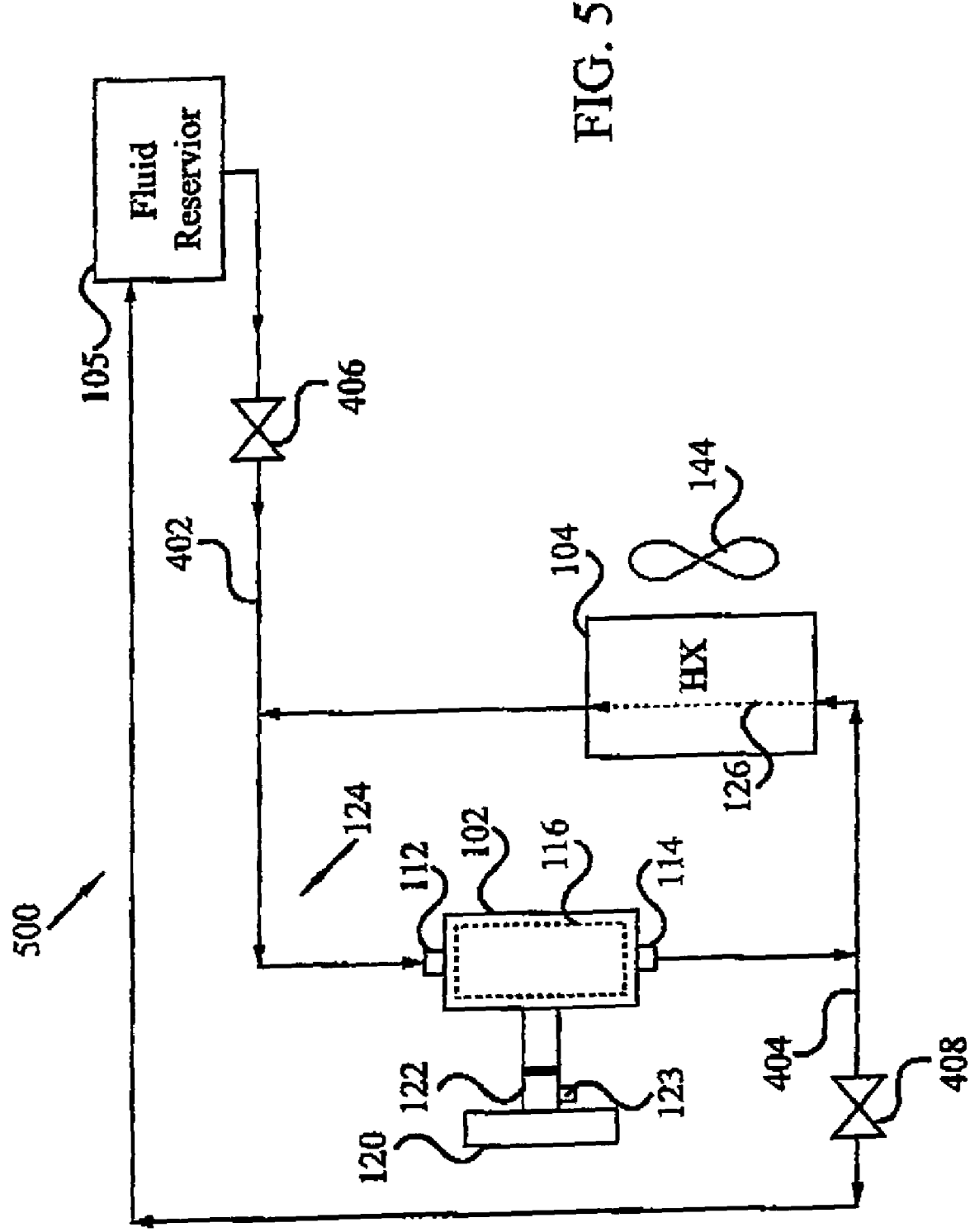
Figure 6:
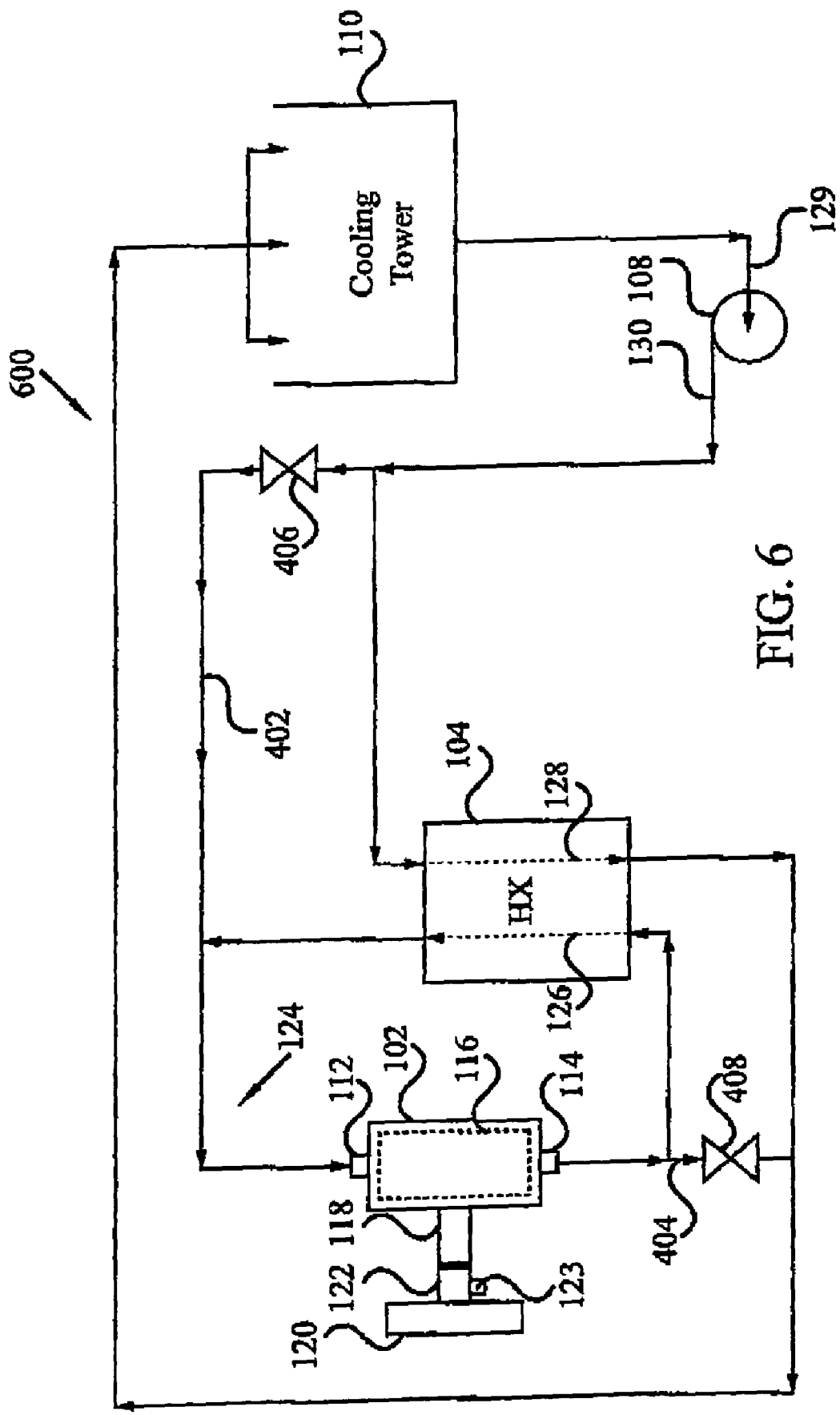

Turning now to FIGS. 4–6, alternative embodiments of the waterbrake dyanamometer volumetric fluid control systems depicted in FIGS. 1–3, respectively, are illustrated. Each of these alternate systems 400, 500, and 600 is similar to the systems 100, 200, and 300 depicted in FIGS. 1–3, respectively, and like reference numerals in FIGS. 4–6 refer to like parts of the systems 100, 200, and 300 depicted in FIG. 1. The alternate system 400, 500, and 600 are similar to the systems 100, 200, and 300 in FIGS. 1–3, respectively, with the exception of the components used to supply fluid to, and remove fluid from, the waterbrake 102. In particular, in the alternate system 400, 500, and 600, the reversible pump assembly 106 is not used. Instead, in the systems 400 and 500 depicted in FIGS. 4 and 5, respectively, a fluid supply passage 402 is coupled in series-fluid communication between the fluid reservoir 105 and the waterbrake fluid inlet port 112, and a discharge passage 404 is coupled in series-fluid communication between the waterbrake fluid outlet port 114 and the fluid reservoir 105. A supply valve 406 is mounted on the fluid supply passage 402, and a discharge valve 408 is mounted on the fluid discharge passage 404. Similarly, in the system 600 depicted in FIG. 6, the fluid supply passage 402, with the supply valve 406 mounted thereon, is coupled in series-fluid communication between the cooling pump outlet 130 and the waterbrake fluid inlet port 112, and the discharge passage 404, with the discharge valve 408 mounted thereon, is coupled in series-fluid communication between the waterbrake fluid outlet port 114 and the cooling system. In each of these alternate systems 400, 500, and 600, to supply fluid to the waterbrake 102, the supply valve 406 is opened until the desired fluid volume is added, and the supply valve 406 is then closed. Similarly, to remove fluid from the waterbrake 102, the discharge valve 408 is opened until the desired fluid volume is removed, and the discharge valve 408 is then closed. It should be appreciated that the supply 406 and discharge 408 valves could be replaced with individual supply and discharge pumps.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A waterbrake dynamometer fluid volumetric control system, comprising:
   a waterbrake having a fluid inlet port and a fluid outlet port;
   a fluid recirculation passage directly coupling the waterbrake fluid outlet port in closed-loop, series-fluid communication with the waterbrake fluid inlet port; and
   a reversible pump assembly having at least a first port coupled in series-fluid communication with the waterbrake fluid inlet and at least a second port adapted for coupling to a fluid supply, the reversible pump operable to selectively supply fluid to, and remove fluid from, the waterbrake.

2. The system of claim 1, wherein the fluid supply is a fluid reservoir tank having fluid therein.

3. The system of claim 1, further comprising:
   a fluid supply pump having an inlet adapted for coupling to the fluid supply and an outlet coupled in series-fluid communication with the reversible pump assembly second port.

4. The system of claim 1, further comprising:
   a heat exchanger assembly having at least a first fluid flow pat coupled in series-fluid communication in the first recirculation passage, the heat exchanger operable to transfer heat from the first fluid flow path to ambient air.

5. The system of claim 1, further comprising:
   a heat exchanger assembly having a first fluid flow path and a second fluid flow path, the first fluid flow path coupled in series-fluid communication in the first recirculation passage, the second fluid flow path coupled in series-fluid communication with a cooling fluid system, the heat exchanger operable to transfer heat between the first and second fluid flow paths.

6. The system of claim 5, further comprising:
a fluid supply pump having an inlet adapted for coupling to the fluid supply and an outlet coupled in series-fluid communication with the heat exchanger second fluid flow path.

7. The system of claim 6, wherein the fluid supply pump outlet is further coupled in series-fluid communication with the reversible pump assembly second port.

8. The system of claim 5, further comprising:
an fan positioned proximate the heat exchanger and operable to flow ambient air through the heat exchanger second fluid flow path.

9. The system of claim 5, further comprising:
a cooling tower coupled to receive fluid from the heat exchanger second flow path and operable to remove heat therefrom.

10. A waterbrake dynamometer fluid volumetric control system, comprising:
a waterbrake having a fluid inlet port and a fluid outlet port;
fluid recirculation means for recirculating fluid discharged from the waterbrake fluid outlet port directly to the waterbrake fluid inlet port; and
fluid volume control means having an outlet port in fluid communication with the water brake fluid inlet port, the fluid volume control means for selectively supplying fluid volume to, and removing fluid volume from, the waterbrake.

11. The system of claim 10, further comprising:
heat removing means for removing heat from the fluid flowing in the fluid recirculation means.

12. The system of claim 10, further comprising:
means for supplying fluid to the fluid volume control means.

13. The system of claim 11, wherein the heat removing means removes heat from the recirculating fluid by transferring the heat to a cooling fluid, and wherein the system further comprises:
cooling means for cooling the cooling fluid.

14. In a waterbrake dynamometer system having a waterbrake including a fluid inlet port, a fluid outlet port, and a rotationally mounted rotor, a method of controlling fluid volume in the waterbrake, comprising:
directly coupling the waterbrake fluid inlet and the waterbrake fluid outlet in closed-loop, series-fluid communication with one another, whereby the waterbrake rotor pumps fluid directly from the waterbrake fluid outlet port to the waterbrake fluid inlet port; and
selectively supplying fluid volume to, and removing fluid volume from, the waterbrake using a reversible pump.

15. The method of claim 14, further comprising:
removing heat from the fluid pumped from the waterbrake fluid outlet port to the waterbrake fluid inlet port.

* * * * *